(12) United States Patent　　　(10) Patent No.:　US 12,699,166 B2

McCord　　　　　　　　　　　　　　(45) Date of Patent:　　　Aug. 4, 2026

---

(54) TECHNIQUES FOR DETECTING AND MITIGATING INTERFERENCE AMONG MULTIPLE LiDAR SENSORS

(71) Applicant: Cepton Technologies, Inc., San Jose, CA (US)

(72) Inventor: Mark A. McCord, Los Gatos, CA (US)

(73) Assignee: Cepton Technologies, Inc., San Jose, CA (US)

( * ) Notice: Subject to any disclaimer, the term of this patent is extended or adjusted under 35 U.S.C. 154(b) by 1294 days.

(21) Appl. No.: 17/380,872

(22) Filed: Jul. 20, 2021

(65) Prior Publication Data

US 2022/0091236 A1　　Mar. 24, 2022

Related U.S. Application Data

(60) Provisional application No. 63/064,362, filed on Aug. 11, 2020, provisional application No. 63/063,830, filed on Aug. 10, 2020.

(51) Int. Cl.
　*G01S 7/48*　　　(2006.01)
　*G01J 5/00*　　　(2022.01)
　*G01S 7/4865*　　(2020.01)
　*G01S 17/86*　　　(2020.01)
　　　　(Continued)

(52) U.S. Cl.
　CPC .............. G01S 7/4804 (2013.01); G01J 5/00 (2013.01); G01S 7/4865 (2013.01); G01S 17/86 (2020.01); G01S 17/894 (2020.01); G01S 17/931 (2020.01); *G01J 2005/0077* (2013.01)

(58) Field of Classification Search
　CPC ....... G01S 7/4804; G01S 7/4876; G01S 17/86
　See application file for complete search history.

(56) References Cited

U.S. PATENT DOCUMENTS

| 10,185,028 B2 * | 1/2019 | Dussan | ................. | G01S 7/4816 |
| 10,203,399 B2 * | 2/2019 | Retterath | ................ | G01S 17/89 |
| 10,656,272 B1 | 5/2020 | Dussan et al. | | |

(Continued)

OTHER PUBLICATIONS

Nternational Search Report/Written Opinion of the International Searching Authority filed Jul. 21, 2021 in related International Application No. PCT/US2021/042591, mailed Nov. 6, 2021 (twelves pages).

*Primary Examiner* — Yuqing Xiao
*Assistant Examiner* — Sean C. Grant
(74) *Attorney, Agent, or Firm* — Kilpatrick Townsend & Stockton LLP

(57)　　　　　　ABSTRACT

A LiDAR system includes a LiDAR sensor and an infrared (IR) camera. The LiDAR sensor includes one or more light sources configured to emit a set of light pulses, one or more detectors configured to receive a set of return light pulses, and a processor configured to determine a time of flight for each return light pulse, and obtain a point cloud based on the times of flight of the set of return light pulses. The IR camera is configured to capture IR images concurrently with operation of the LiDAR sensor, analyze the IR images to detect presence of suspicious IR pulses, and provide information about the suspicious IR pulses to the LiDAR sensor. The processor of the LiDAR sensor is further configured to identify one or more points of the point cloud as suspicious points due to interference based on the information about the suspicious IR pulses.

11 Claims, 7 Drawing Sheets

(51) Int. Cl.
  *G01S 17/894*   (2020.01)
  *G01S 17/931*   (2020.01)

(56)     References Cited

U.S. PATENT DOCUMENTS

| | | | |
|---|---|---|---|
| 2004/0031922 A1* | 2/2004 | Stephan | G01S 7/4804 |
| | | | 348/E5.09 |
| 2008/0040004 A1* | 2/2008 | Breed | G01S 7/023 |
| | | | 701/45 |
| 2016/0003946 A1 | 1/2016 | Gilliland et al. | |
| 2018/0130209 A1* | 5/2018 | Price | G06V 20/10 |
| 2018/0284228 A1 | 10/2018 | LaChapelle | |
| 2019/0120940 A1 | 4/2019 | Pei et al. | |
| 2019/0129009 A1* | 5/2019 | Eichenholz | H03K 17/74 |
| 2019/0339393 A1* | 11/2019 | Lingg | G01S 17/42 |
| 2020/0064452 A1* | 2/2020 | Avlas | G01S 7/4804 |
| 2020/0200873 A1* | 6/2020 | Schmidt | G01S 7/4804 |
| 2021/0405155 A1* | 12/2021 | Shand | G01S 7/4814 |

* cited by examiner

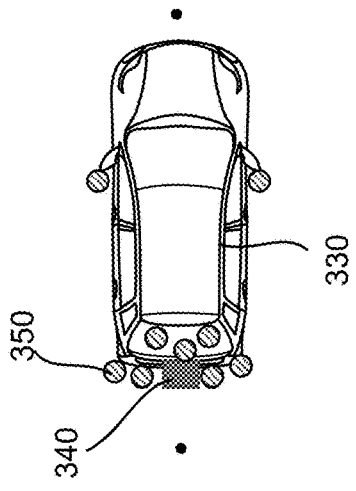
*FIG. 3A*
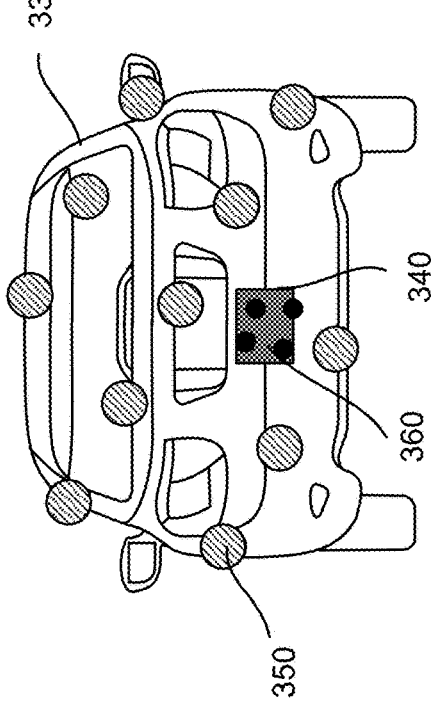
*FIG. 3B*
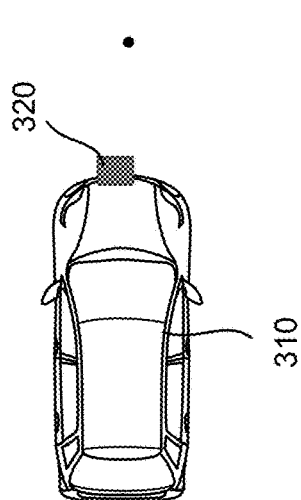

400 emitting, using one or more light sources, a set of light pulses directed toward a scene within a field of view of the LiDAR system    402 detecting, using one or more detectors, a set of return light pulses, at least a subset of the set of return light pulses corresponding to the set of light pulses that have been reflected off of one or more objects in the scene    404 determining a time of flight for each return light pulse of the set of return light pulses    406 obtaining a point cloud based on the times of flight of the set of return light pulses, the point cloud including a set of points representing one or more surfaces of the one or more objects, each point corresponding to a respective return light pulse of the set of return light pulses    408 acquiring IR images of the scene concurrently with operation of the LiDAR system and using an infrared (IR) camera having a field of view that substantially overlaps with the field of view of the LiDAR system    410 analyzing the IR images to detect presence of suspicious IR pulses that are from a source other than the one or more light sources    412 upon detecting presence of the suspicious IR pulses, identifying one or more points of the point cloud as suspicious points due to interference based on information of the suspicious IR pulses    414

*FIG. 4*

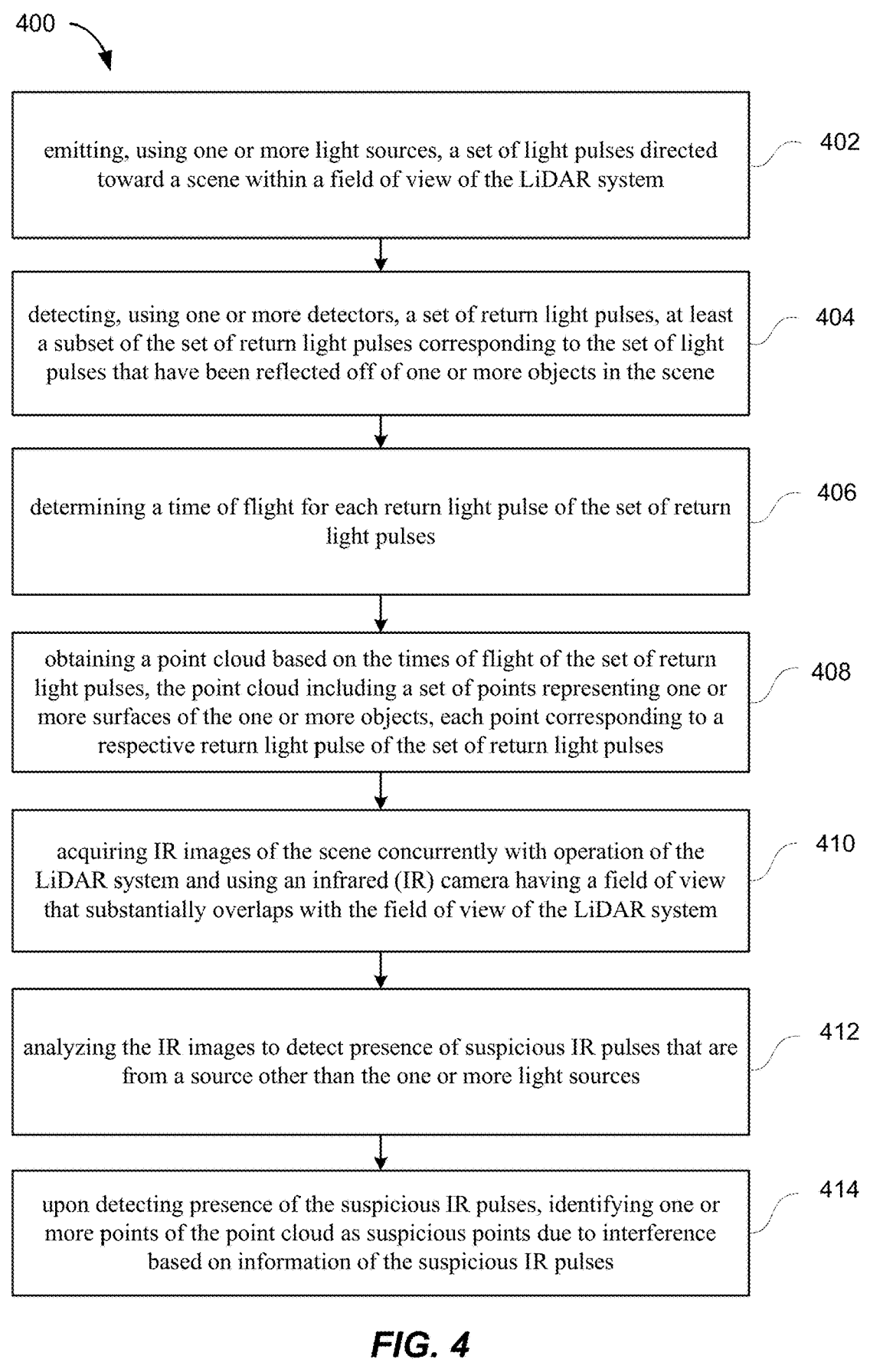

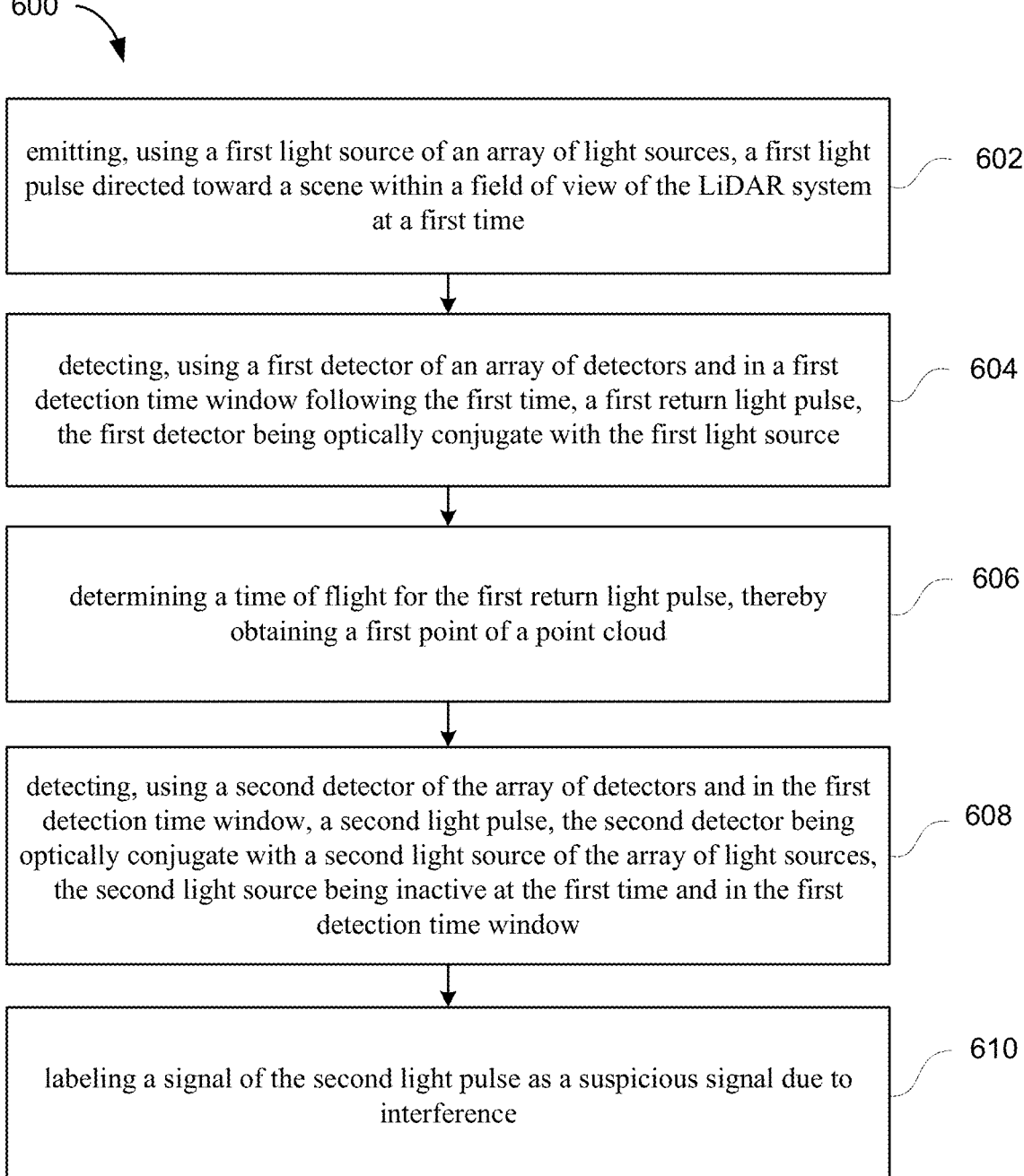

600 emitting, using a first light source of an array of light sources, a first light pulse directed toward a scene within a field of view of the LiDAR system at a first time — 602 detecting, using a first detector of an array of detectors and in a first detection time window following the first time, a first return light pulse, the first detector being optically conjugate with the first light source — 604 determining a time of flight for the first return light pulse, thereby obtaining a first point of a point cloud — 606 detecting, using a second detector of the array of detectors and in the first detection time window, a second light pulse, the second detector being optically conjugate with a second light source of the array of light sources, the second light source being inactive at the first time and in the first detection time window — 608 labeling a signal of the second light pulse as a suspicious signal due to interference — 610

TECHNIQUES FOR DETECTING AND MITIGATING INTERFERENCE AMONG MULTIPLE LiDAR SENSORS

CROSS-REFERENCES TO RELATED APPLICATIONS

This application claims the benefit of U.S. Provisional Patent Application No. 63/063,830 filed on Aug. 10, 2020, and U.S. Provisional Patent Application No. 63/064,362, filed on Aug. 11, 2020, the contents of which are incorporated by reference in their entireties.

BACKGROUND

Three-dimensional (3D) sensors can be applied in autonomous or semi-autonomous vehicles, drones, robotics, security applications, and the like. LiDAR sensors are one type of 3D sensors that can achieve high angular resolutions appropriate for such applications. A LiDAR sensor can include one or more laser sources for emitting laser pulses, and one or more detectors for detecting reflected laser pulses. The LiDAR sensor measures the time it takes for each laser pulse to travel from the LiDAR sensor to an object within the sensor's field of view, then bounce off the object and return to the LiDAR sensor. Based on the time of flight of the laser pulse, the LiDAR sensor determines how far away the object is from the LiDAR sensor. By sending out laser pulses in different directions, the LiDAR sensor can build up a three-dimensional (3D) point cloud of the environment.

In cases in which two or more LiDAR sensors are operating in the vicinity of each other, it is possible that the operation of one LiDAR sensor may interfere with the operation of another LiDAR sensor. For example, as a large number of LiDAR sensors can be deployed in vehicles on the streets, there can be problems with interference among multiple LiDAR sensors. It is possible that a LiDAR sensor may sense a laser pulse without being aware that the laser pulse is not a return laser pulse, but instead is emitted by another LiDAR sensor. Such interfering pulses can show up as false points in the point cloud data, and can potentially lead to undesirable actions by an autonomous vehicle, such as unnecessary emergency breakings. Therefore, there is a need for LiDAR systems and methods that can detect and mitigate interferences.

SUMMARY

According to some embodiments, a LiDAR system includes a LiDAR sensor and an infrared (IR) camera communicatively coupled to the LiDAR sensor. The IR camera is positioned adjacent the LiDAR sensor so that a field of view of the IR camera substantially overlaps with the field of view of the LiDAR sensor. The LiDAR sensor includes one or more light sources configured to emit a set of light pulses to be directed toward a scene within a field of view of the LiDAR sensor, and one or more detectors configured to receive a set of return light pulses. At least a subset of the set of return light pulses corresponds to the set of light pulses that have been reflected off of one or more objects in the scene. The LiDAR sensor further includes a processor coupled to the one or more light sources and the one or more detectors. The processor is configured to determine a time of flight for each return light pulse of the set of return light pulses, and obtain a point cloud based on the times of flight of the set of return light pulses. The point cloud includes a set of points representing one or more surfaces of the one or more objects. Each point corresponds to a respective return light pulse of the set of return light pulses. The IR camera is configured to capture IR images concurrently with operation of the LiDAR sensor, analyze the IR images to detect presence of suspicious IR pulses that are from sources other than the one or more light sources of the LiDAR sensor, and provide information about the suspicious IR pulses to the LiDAR sensor. The processor of the LiDAR sensor is further configured to identify one or more points of the point cloud as suspicious points due to interference based on the information about the suspicious IR pulses.

According to some embodiments, a method of operating a LiDAR system includes emitting, using one or more light sources, a set of light pulses directed toward a scene within a field of view of the LiDAR system, and detecting, using one or more detectors, a set of return light pulses. [a] At least a subset of the set of return light pulses corresponds to the set of light pulses that have been reflected off of one or more objects in the scene. The method further includes determining a time of flight for each return light pulse of the set of return light pulses, and obtaining a point cloud based on the times of flight of the set of return light pulses. The point cloud includes a set of points representing one or more surfaces of the one or more objects. Each point corresponds to a respective return light pulse of the set of return light pulses. The method further includes acquiring IR images of the scene concurrently with operation of the LiDAR system and using an infrared (IR) camera. The IR camera has a field of view that substantially overlaps with the field of view of the LiDAR system. The method further includes analyzing the IR images to detect presence of suspicious IR pulses that are from a source other than the one or more light sources, and upon detecting presence of the suspicious IR pulses, identifying one or more points of the point cloud as suspicious points due to interference based on information of the suspicious IR pulses.

According to some embodiments, a method of operating a LiDAR system includes emitting, using a first light source of an array of light sources, a first light pulse directed toward a scene within a field of view of the LiDAR system at a first time, and detecting, using a first detector of an array of detectors and in a first detection time window following the first time, a first return light pulse. The first detector is optically conjugate with the first light source. The method further includes determining a time of flight for the first return light pulse, thereby obtaining a first point of a point cloud. The method further includes, detecting, using a second detector of the array of detectors and in the first detection time window, a second light pulse. The second detector is optically conjugate with a second light source of the array of light sources, and the second light source is inactive at the first time and in the first detection time window. The method further includes labeling a signal of the second light pulse as a suspicious signal due to interference.

BRIEF DESCRIPTION OF THE DRAWINGS

FIGS. 3A and 3B illustrate an example of interference between LiDAR sensors mounted on two vehicles.

FIG. 4 shows a simplified flowchart illustrating a method of operating a LiDAR system according to some embodiments.

FIG. 6 shows a simplified flowchart illustrating a method of operating a LiDAR system according to some embodiments.

FIG. 7 shows schematic timing diagrams of two LiDAR sensors configured to mitigate interference according to some embodiments.

DETAILED DESCRIPTION OF THE SPECIFIC EMBODIMENTS

According to some embodiments, a LiDAR sensor is paired with an infrared (IR) camera. The IR camera is positioned adjacent the LiDAR sensor so that its field of view substantially overlaps with the field of view of the LiDAR sensor. The IR camera is configured to capture IR images and, based on the IR images, detect presence of IR pulses that are due to interference from other LiDAR sensors. The LiDAR sensor can use the information about the interfering IR pulses provided by the IR camera to take remedial actions to mitigate interference. For example, the LiDAR sensor can identify data points in a point cloud as suspicious points for further analysis, and/or discard the suspicious points. According to some embodiments, instead of using a separate IR camera, "idle" detectors of a LiDAR sensor can be used for detecting interfering IR pulses. In some embodiments, timing synchronization among multiple LiDAR sensors can be employed to prevent or mitigate interferences.

Figure 1:
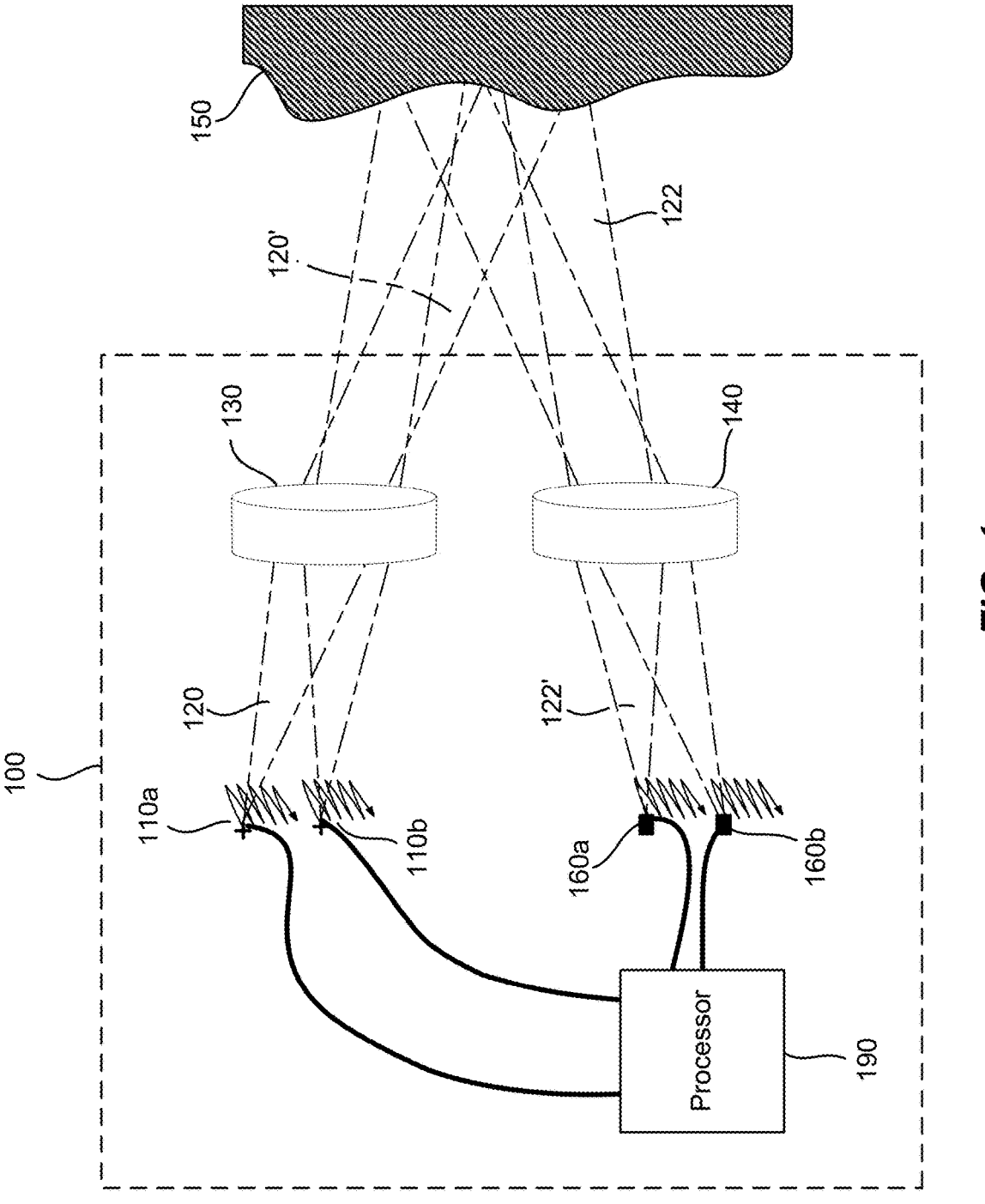
FIG. 1 illustrates an exemplary LiDAR sensor for three-dimensional imaging.

FIG. 1 illustrates an exemplary LiDAR sensor 100 for three-dimensional imaging. The LiDAR sensor 100 includes an emission lens 130 and a receiving lens 140. The LiDAR sensor 100 includes a light source 110a disposed substantially in a back focal plane of the emission lens 130. The light source 110a is operative to emit a light pulse 120 from a respective emission location in the back focal plane of the emission lens 130. The emission lens 130 is configured to collimate and direct the light pulse 120 toward an object 150 located in front of the LiDAR sensor 100. For a given emission location of the light source 110a, the collimated light pulse 120' is directed at a corresponding angle toward the object 150.

A portion 122 of the collimated light pulse 120' is reflected off of the object 150 toward the receiving lens 140. The receiving lens 140 is configured to focus the portion 122' of the light pulse reflected off of the object 150 onto a corresponding detection location in the focal plane of the receiving lens 140. The LiDAR sensor 100 further includes a detector 160a disposed substantially at the focal plane of the receiving lens 140. The detector 160a is configured to receive and detect the portion 122' of the light pulse 120 reflected off of the object at the corresponding detection location. The corresponding detection location of the detector 160a is optically conjugate with the respective emission location of the light source 110a.

The light pulse 120 may be of a short duration, for example, 10 ns pulse width. The LiDAR sensor 100 further includes a processor 190 coupled to the light source 110a and the detector 160a. The processor 190 is configured to determine a time of flight (TOF) of the light pulse 120 from emission to detection. Since the light pulse 120 travels at the speed of light, a distance between the LiDAR sensor 100 and the object 150 may be determined based on the determined time of flight.

One way of scanning the laser beam 120' across a FOV is to move the light source 110a laterally relative to the emission lens 130 in the back focal plane of the emission lens 130. For example, the light source 110a may be raster scanned to a plurality of emission locations in the back focal plane of the emission lens 130 as illustrated in FIG. 1. The light source 110a may emit a plurality of light pulses at the plurality of emission locations. Each light pulse emitted at a respective emission location is collimated by the emission lens 130 and directed at a respective angle toward the object 150, and impinges at a corresponding point on the surface of the object 150. Thus, as the light source 110a is raster scanned within a certain area in the back focal plane of the emission lens 130, a corresponding object area on the object 150 is scanned. The detector 160a may be raster scanned to be positioned at a plurality of corresponding detection locations in the focal plane of the receiving lens 140, as illustrated in FIG. 1. The scanning of the detector 160a is typically performed synchronously with the scanning of the light source 110a, so that the detector 160a and the light source 110a are always optically conjugate with each other at any given time.

By determining the time of flight for each light pulse emitted at a respective emission location, the distance from the LiDAR sensor 100 to each corresponding point on the surface of the object 150 may be determined. In some embodiments, the processor 190 is coupled with a position encoder that detects the position of the light source 110a at each emission location. Based on the emission location, the angle of the collimated light pulse 120' may be determined. The X-Y coordinate of the corresponding point on the surface of the object 150 may be determined based on the angle and the distance to the LiDAR sensor 100. Thus, a three-dimensional image of the object 150 may be constructed based on the measured distances from the LiDAR sensor 100 to various points on the surface of the object 150. In some embodiments, the three-dimensional image may be represented as a point cloud, i.e., a set of X, Y, and Z coordinates of the points on the surface of the object 150.

In some embodiments, the intensity of the return light pulse 122' is measured and used to adjust the power of subsequent light pulses from the same emission point, in order to prevent saturation of the detector, improve eye-safety, or reduce overall power consumption. The power of the light pulse may be varied by varying the duration of the light pulse, the voltage or current applied to the laser, or the charge stored in a capacitor used to power the laser. In the latter case, the charge stored in the capacitor may be varied by varying the charging time, charging voltage, or charging current to the capacitor. In some embodiments, the reflectivity, as determined by the intensity of the detected pulse, may also be used to add another dimension to the image. For example, the image may contain X, Y, and Z coordinates, as well as reflectivity (or brightness).

The angular field of view (AFOV) of the LiDAR sensor 100 may be estimated based on the scanning range of the light source 110a and the focal length of the emission lens 130 as, $$AFOV = 2 \tan^{-1}\left(\frac{h}{2f}\right),$$

where h is scan range of the light source 110*a* along certain direction, and f is the focal length of the emission lens 130. For a given scan range h, shorter focal lengths would produce wider AFOVs. For a given focal length f, larger scan ranges would produce wider AFOVs. In some embodiments, the LiDAR sensor 100 may include multiple light sources disposed as an array at the back focal plane of the emission lens 130, so that a larger total AFOV may be achieved while keeping the scan range of each individual light source relatively small. Accordingly, the LiDAR sensor 100 may include multiple detectors disposed as an array at the focal plane of the receiving lens 140, each detector being conjugate with a respective light source. For example, the LiDAR sensor 100 may include a second light source 110*b* and a second detector 160*b*, as illustrated in FIG. 1. In other embodiments, the LiDAR sensor 100 may include four light sources and four detectors, or eight light sources and eight detectors. In one embodiment, the LiDAR sensor 100 may include eight light sources arranged as a 4×2 array and eight detectors arranged as a 4×2 array, so that the LiDAR sensor 100 may have a wider AFOV in the horizontal direction than its AFOV in the vertical direction. According to various embodiments, the total AFOV of the LiDAR sensor 100 may range from about 5 degrees to about 15 degrees, or from about 15 degrees to about 45 degrees, or from about 45 degrees to about 120 degrees, depending on the focal length of the emission lens, the scan range of each light source, and the number of light sources.

The light source 110*a* may be configured to emit light pulses in the near infrared wavelength ranges. The energy of each light pulse may be in the order of microjoules, which is normally considered to be eye-safe for repetition rates in the KHz range. For light sources operating in wavelengths greater than about 1500 nm (in the near infrared wavelength range), the energy levels could be higher as the eye does not focus at those wavelengths. The detector 160*a* may comprise a silicon avalanche photodiode, a photomultiplier, a PIN diode, or other semiconductor sensors.

In cases in which two or more LiDAR sensors are operating in the vicinity of each other, it is possible that the operation of one LiDAR sensor may interfere with the operation of another LiDAR sensor. As an example, consider a first LiDAR sensor mounted on the front of a first vehicle facing forward, and a second LiDAR sensor mounted on the rear of a second vehicle facing backward. Assume that the second vehicle is 15 m in front of the first vehicle. If the first LiDAR sensor fires a laser pulse toward the second vehicle, a return laser pulse would be received in about 100 nanoseconds, the time it takes for light to make the round trip of 30 m (2×15 m). However, if the second LiDAR sensor fires a laser pulse toward the first vehicle at the same time as the first LiDAR sensors fires its laser pulse at the second vehicle, the first LiDAR sensor may receive the laser pulse fired by the second LiDAR sensor only 50 nanoseconds after the first LiDAR sensor fired its laser pulse. Thus, the first LiDAR sensor may erroneously infer that the second vehicle is only 7.5 m in front of the first vehicle.

Figure 2:
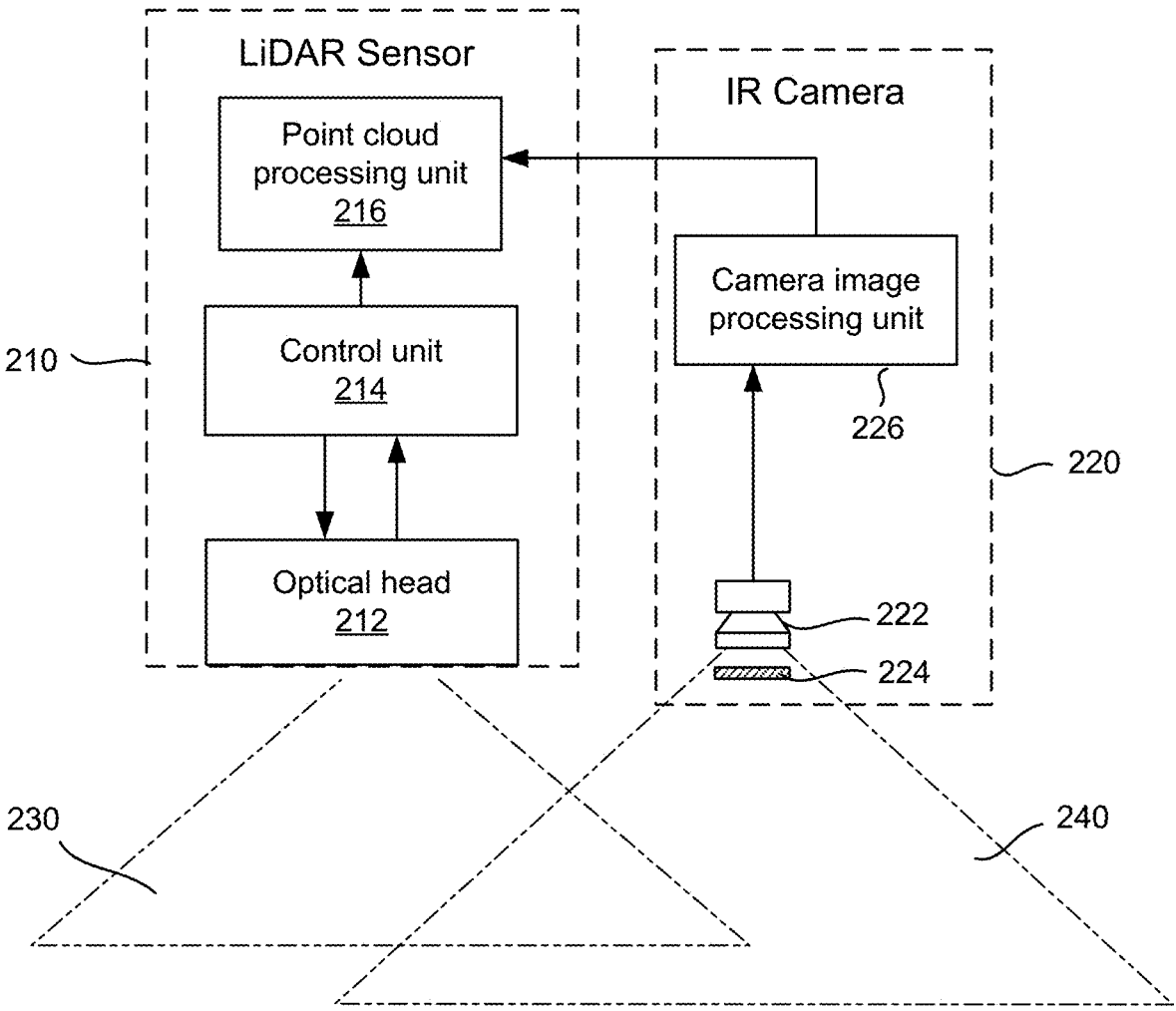
FIG. 2 shows a simplified block diagram of a LiDAR system according to some embodiments.

According to some embodiments, a LiDAR sensor is paired with an infrared camera for detecting and mitigating interference. FIG. 2 shows a simplified block diagram of a LiDAR system according to some embodiments. The LiDAR system includes a LiDAR sensor 210 and an infrared camera 220 positioned adjacent to the LiDAR sensor 210. The LiDAR sensor 210 can include an optical head 212, a control unit 214, and a point cloud processing unit 216. The optical head 212 can include laser sources and detectors, as well as one or more lenses and/or mirrors. The optical head 212 can also include scanning mechanisms. The control unit 214 can be configured to control the firing of the laser sources, and can include electronics for processing the detected laser pulses. The control unit 214 can also control the scanning of the LiDAR sensor 210.

The point cloud processing unit 216 is communicatively coupled to the control unit 214. For example, the control unit 214 can provide the signals from the detected laser pulses along with timing information (e.g., laser firing time and detection time) to the point cloud processing unit 216. In some embodiments, for a scanning LiDAR sensor that uses encoders to measure laser source positions, the control unit 214 can also provide the encoder signals to the point cloud processing unit 216. Based on the information provided by the control unit 214, the point cloud processing unit 216 can build a 3D point cloud of a scene within the field of view 230 of the LiDAR sensor 210.

The infrared (IR) camera 220 is positioned adjacent to the LiDAR sensor 210, so that a field of view 240 of the IR camera 220 substantially overlaps with the field of view 230 of the LiDAR sensor 210. The IR camera 220 can include optical imaging components 222 (e.g., an imaging lens and an image detector). In some embodiments, the IR camera 220 can include an IR bandpass filter 224 that can block visible light in the environment, which might otherwise overwhelm or obscure the IR images.

The IR camera 220 can include an image processing unit 226. IR images captured by the IR camera 220 can be analyzed by the image processing unit 226 to identify laser flashes that might be originated from other LiDAR sensors and can potentially cause interference with the LiDAR sensor 210. The image processing unit 226 can provide information about the presence of potential interfering laser pulses to the point cloud processing unit 216, so that the point cloud processing unit 216 can take remedial actions to mitigate interference. More details about image analysis for interference detection and methods of interference mitigation according to some embodiments are discussed below.

According to various embodiments, the IR camera 220 can be a separate system, or can be integrated with the LiDAR sensor 210. In some embodiments, the image processing unit 226 can be part of the point cloud processing unit 216. One of ordinary skill in the art would recognize many variations, alternatives, and modifications.

Interference Detection from IR Images

It is possible that the IR images captured by the IR camera 220 can include images of laser flashes that are originated from other LiDAR sensors as well as images of reflected laser pulses that are emitted by the LiDAR sensor 210 itself. There may be several ways to distinguish images of laser flashes emitted by other LiDAR sensors from images of reflected laser pulses emitted by the LiDAR sensor 210 itself, as discussed in the example below. In the discussion below, the LiDAR sensor 210 is referred to as the first LiDAR sensor, and an interfering LiDAR sensor is referred to as the second LiDAR sensor. It should be understood that there can be more than one interfering LiDAR sensor.

FIGS. 3A and 3B illustrate an example of interference between two LiDAR sensors mounted on two vehicles. As illustrated, a first vehicle 310 is behind a second vehicle 330. A first LiDAR sensor 320 is mounted in the front of the first vehicle 310 facing forward. A second LiDAR sensor 340 is mounted on the rear of the second vehicle 330 facing backward. Laser pulses emitted by the first LiDAR sensor 320 can be directed toward the second vehicle 330 and be reflected by the second vehicle 330. In FIGS. 3A and 3B, the shaded circles 350 represent the reflected laser spots (FIG.

3B) or the 3D points of the second vehicle 330 as perceived by the first LiDAR sensor 320 (FIG. 3A). By scanning the laser pulses across the field of view and detecting the reflected laser pulses, the first LiDAR sensor 320 can build a 3D point cloud of the second vehicle 330 based on the times of flight of the return laser pulses.

Meanwhile, laser pulses emitted by the second LiDAR sensor 340 can be directed toward the first vehicle 310 and may also be detected by the first LiDAR sensor 320, thus potentially causing interference. In FIGS. 3A and 3B, the solid circles 360 represent the laser spots from the laser pulses emitted by the second LiDAR sensor 340 (FIG. 3B) and the 3D points perceived by the first LiDAR sensor 320 (FIG. 3A). Because the timings of the laser pulses 360 emitted by the second LiDAR sensor 340 may not be synchronized with the timings of the laser pulses 350 emitted by the first LiDAR sensor 320, the perceived distances of the 3D points 360 can be random. For example, some laser pulses 360 emitted by the second LiDAR sensor 340 may arrive before the real return laser pulses 350. In such cases, the perceived distances would be shorter than the actual distance of the second vehicle 330 (e.g., those 3D points 360 between the first vehicle 310 and the second vehicle 330 shown in FIG. 3A). On the other hand, some laser pulses 360 emitted by the second LiDAR sensor 340 may arrive after the real return laser pulses 350. In such cases, the perceived distances of the 3D points 360 would be longer than the actual distance of the second vehicle 330 (e.g., those 3D points 360 in front of the second vehicle 330 shown in FIG. 3A).

FIG. 3B illustrates a view of the rear of the second vehicle 330. An IR camera paired with the first LiDAR sensor 320 can capture IR images of the laser spots 360 emitted by the second LiDAR sensor 340, as well as images of the laser spots 350 emitted by the first LiDAR sensor 320. (The IR camera can be integrated with the first LiDAR sensor 320, and is not shown separately in FIG. 3A. In the discussion below, reference is made to the IR camera 220 illustrated in FIG. 2.)

According to some embodiments, the images of the laser spots 360 emitted by the second LiDAR sensor 340 can be distinguished from the images of the laser spots 350 emitted by the first LiDAR sensor 320 based on their different characteristics. For example, the laser spots 350 emitted by the first LiDAR sensor 320 may appear as larger in size, since the laser beams may have expanded by the time they encounter the second vehicle 330 (e.g., if the second vehicle 330 is a few meters or farther away from the first vehicle 310). In addition, the laser spots 360 emitted by the second LiDAR sensor 340 may appear to be located at the same location (e.g., within the area of the second LiDAR sensor 340). In contrast, the laser spots 350 emitted by the first LiDAR sensor 320 can be scanned over a much larger area across the second vehicle 330. Based on these different characteristics, the image processing unit 226 of the IR camera 220 can analyze the IR images to determine whether a laser spot is from the the second LiDAR sensor 340 or from the first LiDAR sensor 320.

According to some embodiments, the image processing unit 226 can not only detect the presence of interfering laser pulses 360 from the second LiDAR sensor 340, but can also determine the directions from which the interfering laser pulses 360 are coming from based on the positions of the laser spots in the images. In addition, the image processing unit 226 can also determine the timings of the interfering laser pulses 360. The image processing unit 226 can provide these information about the interfering LiDAR sensors to the point cloud processing unit 216 of the first LiDAR sensor 320, so that the point cloud processing unit 216 can take remedial actions to mitigate interference, as discussed below.

Interference Mitigation

According to various embodiments, the point cloud processing unit 216 can mitigate interference in several ways. For example, the point cloud processing unit 216 can block the pixel(s) corresponding to the direction from which an interfering laser pulse is coming (e.g., by disabling those pixels or discarding the data of those pixels). If the timing of the interfering laser pulse is known, the point cloud processing unit 216 can block those pixels in the appropriate time window accordingly. In some embodiments, the point cloud processing unit 216 can flag the data points of those pixels as suspicious data points, so that they can be further analyzed. If deemed to be false points caused by interference (as opposed to valid data points), those data points can be discarded.

According to some embodiments, further analysis of the suspicious data points can be performed based on additional information. For example, if the distance to the second LiDAR sensor 340 from the first LiDAR sensor 320 can be estimated, any suspicious data point that indicates a distance significantly different from the estimated distance (e.g., if the difference is above a threshold) can be considered as a false point and be discarded. Other characteristics of an interfering laser pulse, such as its pulse width and intensity, can also be used in the further analysis. For example, if the pulse width of the suspicious laser pulse is different from the pulse width of the laser pulses of the first LiDAR sensor 320, it can be inferred that the suspicious laser pulse is due to interference (e.g., from a LiDAR sensor made by another manufacturer). If the intensity of the suspicious laser pulse is higher than the expected intensity range of a return laser pulse for the detection range of the first LiDAR sensor 320, it can be inferred that the suspicious laser pulse is likely from an interfering LiDAR sensor as it has traveled only one way instead of the round trip for a return laser pulse.

According to some embodiments, the IR camera 220 can determine the timings of the suspicious laser pulses (e.g., from the frame number). The timing information can be provided to the point cloud processing unit 216 in real time, so that the point cloud processing unit 216 can block the corresponding pixels in the appropriate time windows accordingly. For example, assume that the second LiDAR sensor 340 is a rotating LiDAR sensor, in which the optical head rotates 360 degrees at a certain rotational rate (e.g., at 600 RPM or 10 rotations per second). During the majority of the times, the second LiDAR sensor 340 will be pointing in other directions and will not cause interference with the first LiDAR sensor 320. Assume that the IR camera 220 can determine the rotational frequency and the timing of the second LiDAR sensor 340, the point cloud processing unit 216 of the first LiDAR sensor 320 can block those pixels only during the time windows when the second LiDAR sensor 340 is directed at the first LiDAR sensor 320, and resume normal operation at all other times.

FIG. 4 shows a simplified flowchart illustrating a method 400 of operating a LiDAR system according to some embodiments.

The method 400 includes, at 402, emitting, using one or more light sources, a set of light pulses directed toward a scene within a field of view of the LiDAR system.

The method 400 further includes, at 404, detecting, using one or more detectors, a set of return light pulses. at least a subset of the set of return light pulses corresponds to the set of light pulses that have been reflected off of one or more objects in the scene.

The method 400 further includes, at 406, determining a time of flight for each return light pulse of the set of return light pulses.

The method 400 further includes, at 408, obtaining a point cloud based on the times of flight of the set of return light pulses. The point cloud includes a set of points representing one or more surfaces of the one or more objects. Each point corresponds to a respective return light pulse of the set of return light pulses.

The method 400 further includes, at 410, acquiring infrared (IR) images of the scene using an IR camera concurrently with operation of the LiDAR system. The IR camera has a field of view that substantially overlaps with the field of view of the LiDAR system.

The method 400 further includes, at 412, analyzing the IR images to detect presence of suspicious IR pulses that are from a source other than the one or more light sources.

The method 400 further includes, at 414, upon detecting presence of the suspicious IR pulses, identifying one or more points of the point cloud as suspicious points due to interference based on information of the suspicious IR pulses.

It should be appreciated that the specific steps illustrated in FIG. 4 provide a particular method of operating a LiDAR system according to some embodiments. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added and some steps may be removed depending on the particular applications. One of ordinary skill in the art would recognize many variations, modifications, and alternatives.

Using "Idle" Detectors of a LiDAR Sensor to Detect Interference

Figure 5:
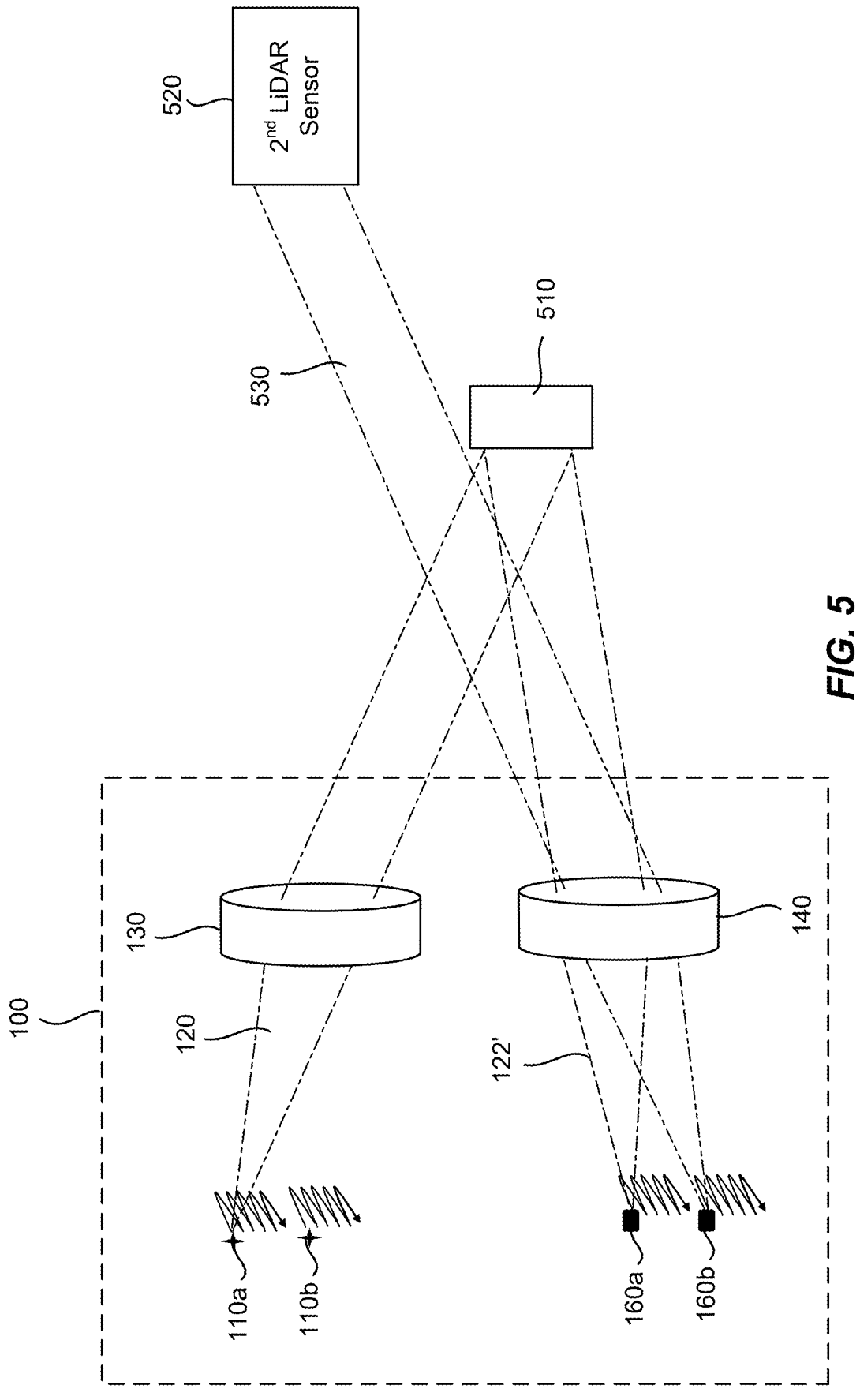
FIG. 5 illustrates an example of using an idle detector of a LiDAR sensor for detecting interference according to some embodiments.

According to some embodiments, instead of using a separate IR camera, a LiDAR sensor can detect interfering laser pulses using its own detector(s) that would be otherwise idle at a given time. FIG. 5 illustrates an example. The LiDAR sensor 100 is similar to the LiDAR sensor 100 illustrated in FIG. 1, and like numerals refer to like elements. In this example, two laser sources 110*a* and 110*b*, and two corresponding detectors 160*a* and 160*b* are shown. It should be understood that the LiDAR sensor 100 can include more than two laser sources and more than two detectors. As discussed above with reference to FIG. 1, each laser source is optically conjugate with a corresponding detector. For instance, a laser pulse 120 emitted by a first laser source 110*a* can be reflected by an object 510, so that the portion 122' of a return laser pulse can be detected by the corresponding first detector 160*a*.

In some embodiments, only one or a few laser sources are fired at any given time period, during which the remaining laser sources and their corresponding detectors are inactive. For instance, in the example illustrated in FIG. 5, the second laser source 110*b* is not fired while the first laser source 110*a* is fired. Accordingly, the second detector 160*b* would be idle during that time period when the first laser source 110*a* is fired. Thus, if the second detector 160*b* nonetheless detects a laser pulse 530 in that time period, it can be assumed that the detected laser pulse 530 is likely from a second LiDAR sensor 520. Based on the direction and the timing of the detected laser pulse 530, the LiDAR sensor 100 can take some remedial actions to mitigate interference, as discussed above. For example, the LiDAR sensor 100 can label the signal of the light pulse 530 as a suspicious signal due to interference, and/or discard the signal of the light pulse 530. In some embodiments, the LiDAR sensor 100 can label future light pulses detected by the second detector 160*b* in immediate subsequent time periods as suspicious signals.

FIG. 6 shows a simplified flowchart illustrating a method 600 of operating a LiDAR system according to some embodiments.

The method 600 includes, at 602, emitting, using a first light source of an array of light sources, a first light pulse directed toward a scene within a field of view of the LiDAR system at a first time.

The method 600 further includes, at 604, detecting, using a first detector of an array of detectors and in a first detection time window following the first time, a first return light pulse. The first detector is optically conjugate with the first light source.

The method 600 further includes, at 606, determining a time of flight for the first return light pulse, thereby obtaining a first point of a point cloud.

The method 600 further includes, at 608, detecting, using a second detector of the array of detectors and in the first detection time window, a second light pulse. The second detector is optically conjugate with a second light source of the array of light sources, and the second light source is inactive at the first time and in the first detection time window.

The method 600 further includes, at 610, labeling a signal of the second light pulse as a suspicious signal due to interference.

In some embodiments, the method 600 further includes discarding the signal of the second light pulse.

In some embodiments, the method 600 further includes detecting, using the second detector and in one or more detection time windows subsequent to the first detection time window, one or more third light pulses, and labeling the one or more third light pulses as suspicious signals due to interference.

It should be appreciated that the specific steps illustrated in FIG. 6 provide a particular method of operating a LiDAR system according to some embodiments. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added and some steps may be removed depending on the particular applications. One of ordinary skill in the art would recognize many variations, modifications, and alternatives.

Temporal Synchronization among Multiple LiDAR Sensors

Figure 7:
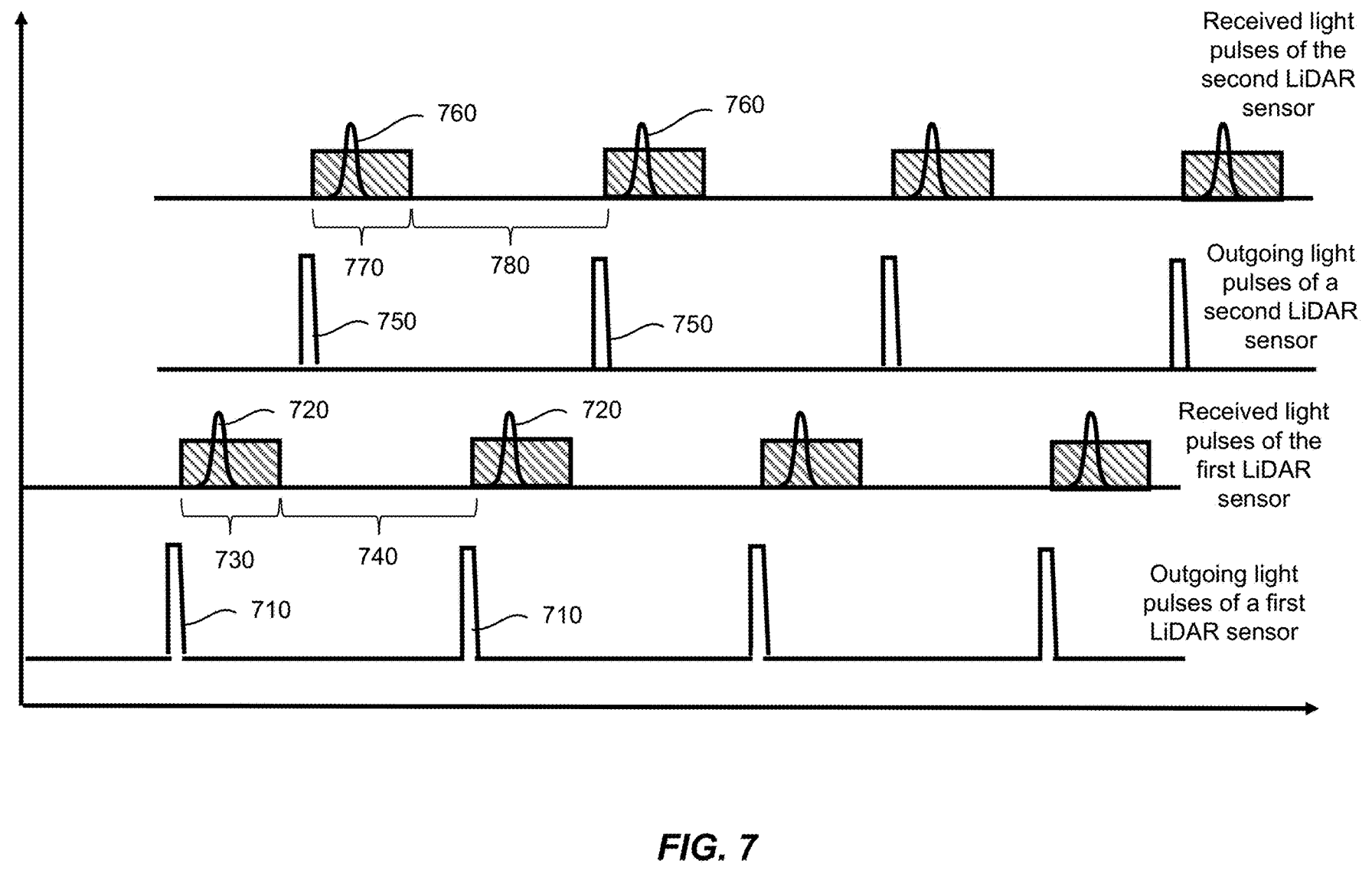

According to some embodiments, interference among multiple LiDAR sensors in close proximity of each other can be mitigated by synchronizing the firing sequence of the light pulses among the LiDAR sensors. As an example, FIG. 7 shows schematic timing diagrams of two LiDAR sensors. The bottom row shows a train of outgoing light pulses 710 fired by a first LiDAR sensor (e.g., the first LiDAR sensor 320 shown in FIG. 3A). The second row from the bottom in FIG. 7 shows return light pulses 720 detected by the first LiDAR sensor. The detector of the first LiDAR sensor is active in the detection time windows 730, and is inactive in the idle time windows 740. Thus, only those return light pulses 720 that fall within the detection time windows 730 are detected. Return light pulses that fall in the idle time windows 740 will not be detected. In a scanning LiDAR sensor (e.g., the scanning LiDAR sensor illustrated in FIG. 1), each light pulse 710 in the train of light pulses may be directed in a slightly different direction so as to scan across a field of view.

The third row from the bottom in FIG. 7 shows a train of outgoing light pulses 750 fired by a second LiDAR sensor (e.g., the second LiDAR sensor 340 shown in FIG. 3A). The top row in FIG. 7 shows detected return light pulses 760 detected by the second LiDAR sensor.

The detector of the second LiDAR sensor is active in the detection time windows 770, and is inactive in the idle time windows 780. As illustrated in FIG. 7, if the timings of the light pulses 710 fired by the first LiDAR sensor and the timings of light pulses 750 fired by the second LiDAR sensor are synchronized with respect to each other such that the detection time windows 770 of the second LiDAR sensor falls in the idle time windows 740 of the first LiDAR sensor, interference between the first LiDAR sensor and the second LiDAR sensor can be avoided.

One way to achieve temporal synchronization among multiple LiDAR sensors is via vehicle-to-vehicle communication. However, if the communication system of one of the vehicles is impaired, the synchronization can become unreliable. Another way to synchronize multiple LiDAR sensors is by using a precision timing signal, such as a pulse per second (PPS) signal from the Global Positioning System (GPS). However, without vehicle-to-vehicle communication, there may be only a limited number of time slots available. Thus, there is still a chance that two vehicles can have LiDAR sensors that interfere with each other because they are on the same time slot.

According to some embodiments, an IR camera paired with the first LiDAR sensor can determine the timings of the light pulses from the second LiDAR sensor. The control unit of the first LiDAR sensor can then adjusts the timings of the light pulses from the first LiDAR sensor so that the detection time windows 730 of the first LiDAR sensor do not overlap with the detection time windows 770 of the second LiDAR sensor. This would allow synchronization between the first LiDAR sensor and the second LiDAR sensor without relying on vehicle-to-vehicle communication or the precision timing signals such as PPS signals from the GPS.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of operating a LiDAR system, the method comprising:

emitting, using an array of light sources, a train of light pulses directed toward a scene within a field of view of the LiDAR system;

detecting, using an array of detectors, a return light pulse during a first time window, wherein the array of detectors is arranged to have a detection time window and an idle time window between pulses of the train of light pulses, and the first time window is during the detection time window;

determining a time of flight for the return light pulse, thereby obtaining a first point of a point cloud;

detecting, using the array of detectors and in a second time window, a second light pulse wherein the second time window is during the idle time window of the array of detectors, so that a LiDAR sensor of the LiDAR system can detect interfering laser pulses using a detector that would otherwise be idle at a given time;

labeling a signal of the second light pulse as a suspicious signal due to interference based on the second light pulse being detected during the idle time window of the LiDAR sensor;

determining timings of suspicious signals, using data from the array of detectors during idle time windows; and controlling the array of light sources to emit the train of light pulses so that the train of light pulses is temporally synchronized with the suspicious signals, thereby mitigating interference.

2. The method of claim 1 further comprising discarding the signal of the second light pulse.

3. The method of claim 1 further comprising:

detecting, using the array of detectors and in one or more detection time windows subsequent to the first time window, one or more third light pulses; and labeling the one or more third light pulses as suspicious signals due to interference.

4. The method of claim 1 further comprising:

detecting a third pulse, using the array of detectors, in a third time window; and labeling the third pulse as a suspicious signal due to interference.

5. The method of claim 1 further comprising:

comparing an intensity of a detected light pulse corresponding to the second light pulse with an expected intensity range; and upon determining that the intensity of the second light pulse is outside the expected intensity range, discarding the signal of the second light pulse.

6. The method of claim 1 further comprising:

comparing a pulse width of a detected light pulse with a nominal pulse width of a pulse in the train of light pulses; and upon determining that the pulse width of the detected light pulse differs from the nominal pulse width by a threshold amount, discarding the signal of the detected light pulse.

7. The method of claim 1 further comprising:

estimating a distance to a second lidar sensor, and labeling distances in a direction of the second lidar sensor as suspicious that have a difference from the distance estimated that are above a threshold.

8. The method of claim 1 further comprising:

determining timings of suspicious signals; and blocking a pixel in a time window based on determining timings of the suspicious signals.

9. The method of claim 1 further comprising using vehicle-to-vehicle communication to synchronize multiple LiDAR sensors.

10. The method of claim 1 further comprising using a precision timing signal from a Global Navigation Satellite System to synchronize multiple LiDAR sensors.

11. The method of claim 1 further comprising:

determining timings of suspicious signals, using data from the array of detectors during idle time windows; and controlling the array of light sources, based on determining timings of the suspicious signals, to emit the train of light pulses so that the train of light pulses is temporally controlled to mitigate interference with the suspicious signals.

\* \* \* \* \*